Dec. 29, 1931.  H. F. FISHER  1,838,927
STEPPED CONE TYPE TREATER
Filed June 23, 1927
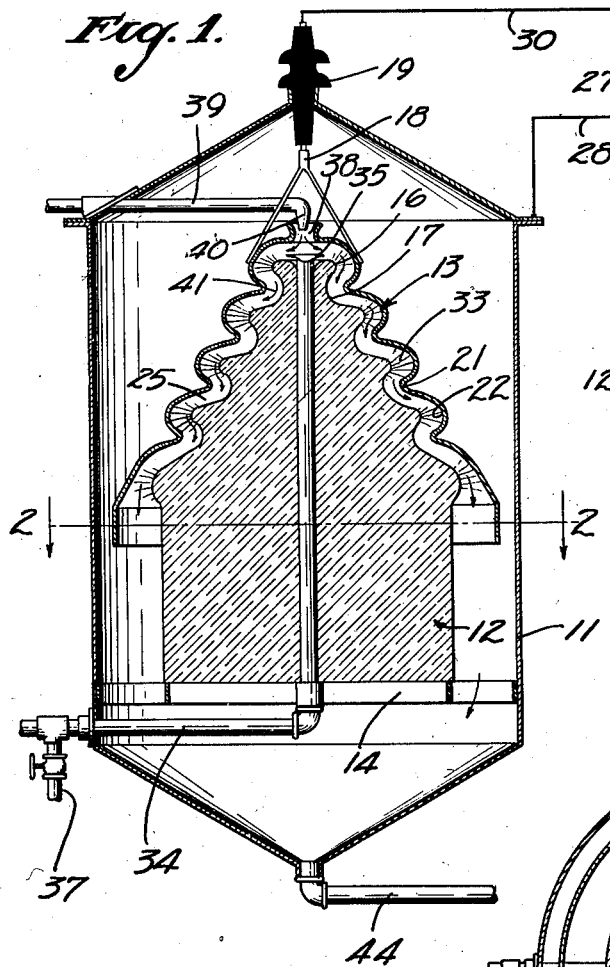
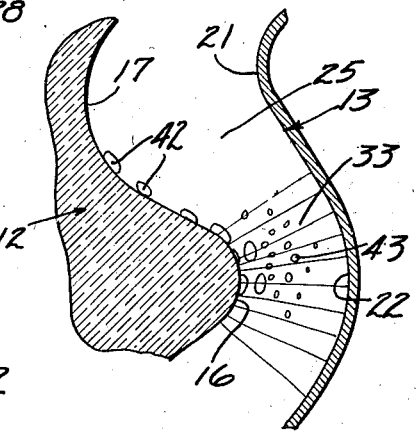
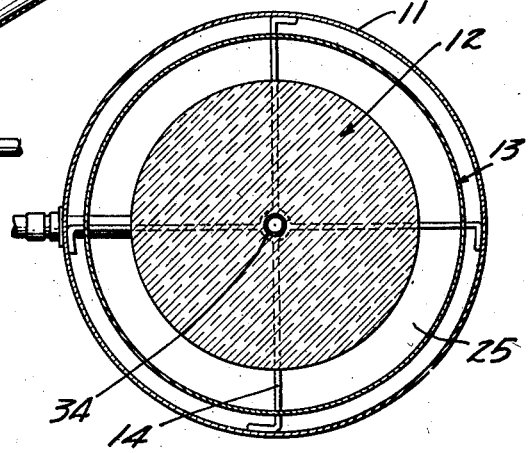
INVENTOR:
HARMON F. FISHER
BY
ATTORNEY.

Patented Dec. 29, 1931

1,838,927

UNITED STATES PATENT OFFICE

HARMON F. FISHER, OF LONG BEACH, CALIFORNIA, ASSIGNOR TO PETROLEUM RECTIFY-ING COMPANY OF CALIFORNIA, OF LOS ANGELES, CALIFORNIA, A CORPORATION OF CALIFORNIA

STEPPED CONE-TYPE TREATER

Application filed June 23, 1927. Serial No. 200,878.

My invention relates to apparatus for separating the phases of an emulsion, and is particularly valuable in the form of a dehydrator for separating water from petroleum.

Petroleum taken from an oil well often becomes associated with water and forms into an emulsion. The small particles of water will not settle from the petroleum even though it is permitted to stand over long periods. It is common practice in the art to electrically treat the emulsion by passing it through an electric dehydrator in which the emulsion is subjected to the action of an electric field and the water particles coalesced into masses of water of sufficient size to gravitate from the petroleum.

It is an object of this invention to provide an electric dehydrator for this purpose.

The emulsion may be economically treated by providing a treater having zones of high intensity in the treating space. The emulsion passes through these zones of high intensity and is broken down by a bombarding action of small particles of water being projected violently in these zones.

It is an object of this invention to provide a dehydrator in which the electric field has zones of high field intensity in which a violent bombarding action may take place.

This invention is an improvement of my invention presented to the Patent Office in my application entitled Dehydrator with hygroscopic surfaces, filed August 30, 1926, Serial No. 132,374. In that application I presented to the Patent Office a dehydrator similar to the one of this invention and having sharp edges for providing the zones of high field intensity. The zones in that dehydrator are limited in size and therefore certain types of emulsions cannot be treated rapidly. I have found that the capacity of the dehydrator may be increased if the sharp edges are rounded so as to form nodules or crests. This distributes the zones of high field intensity over a larger area and consequently subjects the emulsion to longer periods of bombardment.

It is an object of this invention to provide a dehydrator in which the zones of high field intensity are large enough to permit a rapid treatment of emulsion.

Other objects and advantages of the invention may be best understood by reference to the accompanying drawings in which:

Fig. 1 is a vertical cross section.

Fig. 2 is a horizontal cross section taken on the line 2—2 of Fig. 1.

Fig. 3 is an enlarged view illustrating the bombarding action which occurs in the zones of high field intensity.

The form of the invention illustrated has a tank 11 in which a grounded or primary electrode 12 and a live or secondary electrode 13 are placed.

The grounded electrode 12 is supported by a frame 14 in a central position inside the shell 11. The upper part of the electrode 12 is substantially conical but instead of having a flat surface is provided with a surface having a wave-shaped cross section. The surface of the electrode 12 is provided with alternate crests 16 and troughs 17. The live electrode 13 is supported by a supporting-means 18 which is connected to an insulator 19. The live electrode 13 is also conical and has alternate crests 21 and troughs 22 which are annular. As shown clearly in Figs. 1 and 3 the crests 21 of the live electrode are adjacent to the troughs 17 of the grounded electrode, and the troughs 22 of the live electrode are adjacent to the crests 16 of the grounded electrode. The two electrodes are separated from each other to provide a treating-space 25. The treating-space 25 is annular and has a wave-shaped cross section as illustrated in Fig. 1.

The electrodes are connected to a transformer 26. This transformer 26 has a secondary winding 27, one conductor 28 of which is connected to the shell 11 and another conductor 30 of which is connected to the supporting-means 18. When a primary winding 31 of the transformer 26 is energized, an electric field is set up in the treating-space 25. The electric field in the treating-space 25 in this invention is substantially of the same character as is provided in the invention of the application mentioned in the introduction to the specification. The crests 16 provide rounded edges where zones of high field intensity are formed, these zones being indicated in the drawings at 33.

Emulsion to be treated is supplied through an emulsion inlet pipe 34. This emulsion inlet pipe extends upward through the electrode 12 to the upper part of the treating-space 25. A baffle-plate 35 is located at the upper end of the pipe 34 so that the incoming emulsion is deflected and will flow in contact with the surface of the grounded electrode 12. To assist in holding the emulsion to the grounded electrode 12, this grounded electrode is formed from a material having an affinity for the emulsion. This material is any material such as plaster of Paris or cement which has an affinity for water. In view of the fact that emulsion contains water, the emulsion will be attracted to the surface of the grounded electrode and will tend to pass through the treating-space 25 in contact with the grounded electrode 12. The emulsion inlet pipe 34 has a branch pipe 37, by means of which an electrolyte such as salt water may be added to the emulsion in case it is desired to have a greater percentage of water in the emulsion.

The upper part of the treating-space 25 is provided with a mouth 38 formed in the live electrode 13. A dry oil pipe 39 is extended into the shell 11 and has a nozzle 40 which is adapted to direct dry oil through the mouth 38 and into the treating-space 35. This dry oil serves a twofold purpose; first, it maintains a flow through the treating-space as indicated by arrows 41, this being in opposition to the natural tendency of the dry oil to rise in this space. Another purpose of the dry oil is to form a self-healing dielectric barrier between the two electrodes 12 and 13. As clearly explained in my application entitled Dehydrator having hygroscopic emulsion inlet, filed September 16, 1926, Serial No. 135,803, dry oil when passed adjacent to an electrode of lowest field intensity prevents short-circuiting which would occur if the wet emulsion filled the entire treating-space 25 so that chains of water might connect to both of the electrodes.

The operation of the invention is as follows:

It is desirable to first fill the shell 11 with dry oil. This may be done by means of the dry oil pipe 39. An electric field is then established in the treating-space 25 and emulsion to be treated is supplied to the emulsion inlet pipe 34. The emulsion passes through the upper end of the emulsion inlet pipe 34 and is deflected by the deflector 35 radially outward in contact with the surface of the grounded electrode 12. The emulsion flows downwardly along this surface and into the successive troughs and over the successive crests in contact with or very near to the electrode 12 through the entire treating-space 25. The dry oil which is continually being passed through the treating-space 25 surrounds the layer of emulsion which is around the grounded electrode 12 and thus forms a complete self-healing dielectric barrier. The treating action which takes place in the treating-space 25 is illustrated in Fig. 3. It is well known that an electric field tends to concentrate where an electrode is pointed or provides an edge. This edge in my invention is provided by changing the direction of the surface of the electrode 12. The zones of high field intensity 33 are thus provided. The water particles of the emulsion which are of sufficient size to be attracted to the grounded electrode 12 will flow along the grounded electrode 12 as indicated at 42 in Fig. 3. When a zone of high field intensity is reached, the concentration of lines of force impel the water particles violently from the grounded electrode 12. These water particles 42 being violently impelled bombard small particles 43 which are so small that they are trapped in the emulsion. The bombarding of these small particles cause them to join together either with each other or with the larger particle which is being shot against it. The bombarding particles may be either positively or negatively charged and they tend to pass back and forth in the treating-space 25. During these periods they are attracted by and attract water particles of opposite polarity so that coalescing action takes place. In the event that an electrolyte is added to the emulsion prior to the time that it enters the electric field, the electrolyte associates itself at least in part with the water phase of the emulsion whereby the particles expelled by the high intensity field are electrolytic in the sense that they contain the electrolyte. Such a discharging of electrolytic particles is often very desirable.

In the drawings I have shown only the grounded electrode 12 as being formed of the material having an affinity for the emulsion. This is done in view of the fact that it is desirable to maintain the emulsion in the inner part of the treating-space 25 because it is the part of the treating-space of highest field intensity. If desired, the live electrode 13 may also be formed of or coated with the same material so that a pronounced bombarding action may also take place at the crests 21.

In the present invention there may be a slight bombarding action taking place also at the crests 21, but the greatest action takes place at the crests 16 of the grounded electrode 12 and in the zone of high field intensity 33. The emulsion and dry oil pass downward to the lower part of the shell 11 and are withdrawn through a pipe 44. This pipe 44 conveys the oil and water particles to a settling tank where the water is precipitated.

In the foregoing description I have described the invention in connection with the dehydrating of petroleum emulsion. It should be understood that this dehydrator is capable of treating other emulsions and is not necessarily limited to an emulsion in which water forms a part or in which one of the phases is petroleum.

I claim as my invention:

1. In an electric dehydrator, the combination of: a pair of electrodes, one of said electrodes having a continuous series of alternate troughs and crests, said crests being substantially broad to form relatively extensive zones of high field intensity in the space between said electrodes; means for creating an electric field in said space; and means for introducing an emulsion into said space in such a manner that water particles of said emulsion will be projected violently from said crests by said zones of high field intensity.

2. A combination as defined in claim 1 in which said electrode having alternate troughs and crests is formed of a material which has a particular affinity for one phase of said emulsion.

3. A combination as defined in claim 1 in which dry oil is passed through said space adjacent to one of said electrodes.

4. A combination as defined in claim 1 in which a dielectric barrier is passed through said space adjacent to one of said electrodes.

5. A combination as defined in claim 1 in which one of said electrodes surrounds the other and in which said electrodes are of a general conical shape.

6. A combination as defined in claim 1 in which means is provided for directing the emulsion along said electrode having alternate troughs and crests.

7. In an electric dehydrator, the combination of: a primbary electrode of a general conical form having annular troughs and crests which are alternately arranged; a secondary electrode of a general conical form having annular troughs and crests which are alternately arranged, said electrodes having a treating-space provided therebetween, said treating-space being of wave-shaped cross-section; means for establishing an electric field in said treating-space; and means for introducing an emulsion into said space in such a manner that the water particles of said emulsion will be projected violently from the crests of one of said electrodes.

8. In an electric dehydrator, the combination of: a pair of electrodes, one of said electrodes being grooved to form alternate troughs and crests disposed to provide a series of progressive steps, said grooved electrode and the other of said electrodes defining an intermediate treating space and said crests forming zones of high field intensity in said space; means for producing an electric field in said space; and means for introducing an emulsion adjacent an upper portion of the stepped surface of said one electrode in such a manner as to cause said emulsion to move downwardly into the successive troughs and over the successive crests in contact with the stepped surface, so that water particles of said emulsion will be projected violently from said crests by said zones of high field intensity.

9. A combination as defined in claim 8 in which said stepped electrode is formed of a material having an affinity for said emulsion.

10. A combination as defined in claim 8 in which dry oil is passed through said treating space adjacent said other electrode.

11. A combination as defined in claim 8 in which a dielectric barrier is passed through said treating space, between said emulsion and said other electrode.

12. A combination as defined in claim 8 in which both electrodes are of general conical shape with said other electrode surrounding said stepped electrode.

13. A combination as defined in claim 8 in which said other electrode is provided with troughs and crests, the troughs of one electrode being disposed adjacent the crests of the opposite electrode, so as to form a treating space having the contour of an ogee curve.

14. In an electrical dehydrator, the combination of: a pair of electrodes defining a treating space a cross section of which is in the shape of an ogee curve; means for establishing an electric field in said space; and means for directing a flow of emulsion into said field adjacent the surface of one of said electrodes.

15. In an electrical dehydrator, the combination of: a pair of electrodes defining a treating space a cross section of which is in the shape of an ogee curve; means for establishing an electric field in said space; means for directing a flow of emulsion into said field adjacent the surface of one of said electrodes; and means for passing a dielectric fluid through at least a portion of said field in contact with the other of said electrodes.

16. A combination as defined in claim 14 in which said treating space is annular and increases in diameter throughout the length thereof, and in which said emulsion is introduced into that portion of the field which is of smallest diameter.

17. In an electrical dehydrator, the combination of: a pair of electrodes defining a treating space therebetween, a cross section of which is in the form of an ogee curve; means for establishing an electric field in said space; means for introducing emulsion to be treated into said space; and means for injecting a dry oil into said space in a manner to reverse the normal direction of flow in said treating space of the dry oil separated from said emulsion.

In testimony whereof, I have hereunto set my hand at Borger, Texas, this 14th day of June, 1927.

HARMON F. FISHER.